UNITED STATES PATENT OFFICE.

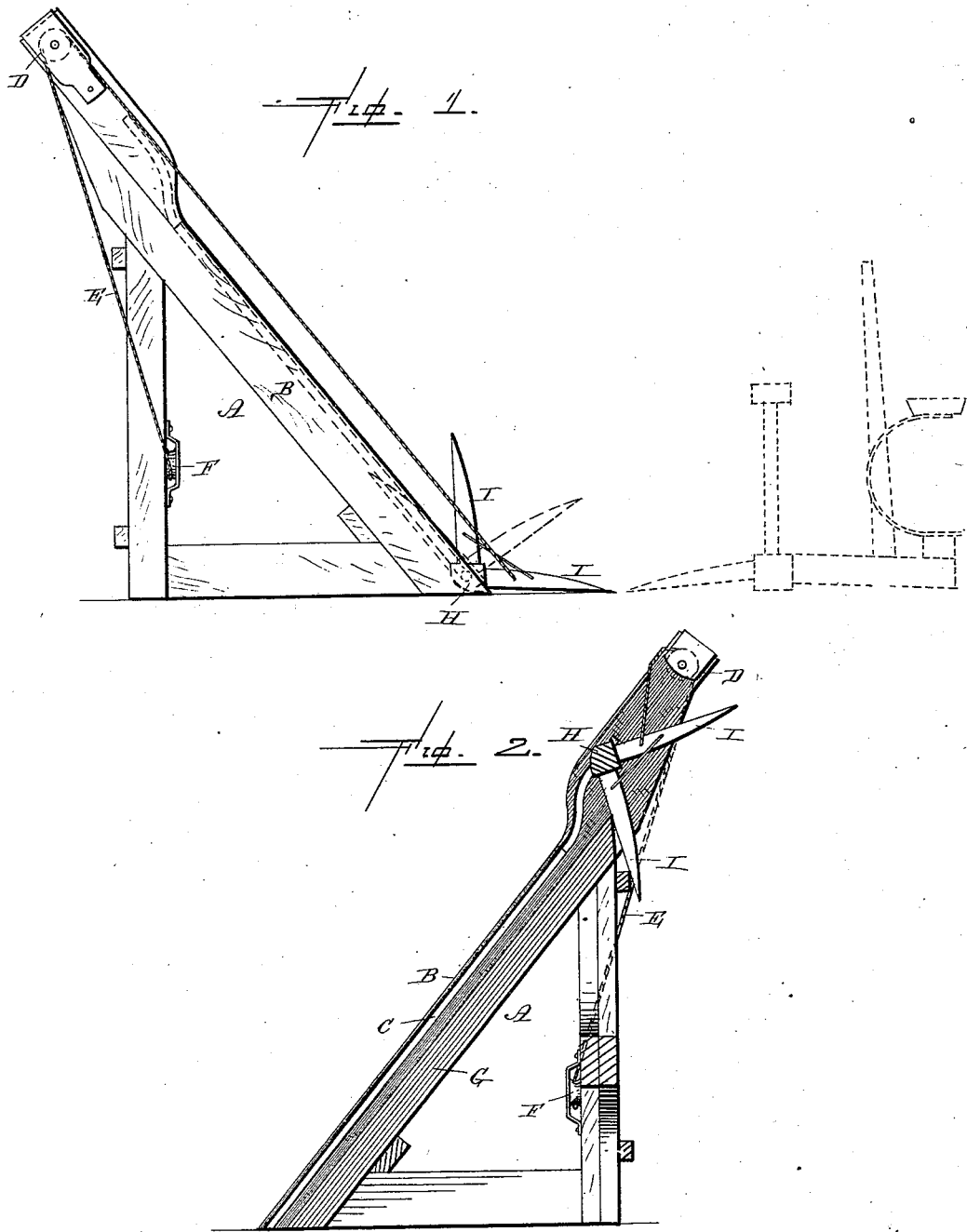

WESLEY KLINKER, OF UNION MILLS, IOWA.

HAY-STACKER.

SPECIFICATION forming part of Letters Patent No. 304,270, dated August 26, 1884.

Application filed June 28, 1884. (No model.)

*To all whom it may concern:*

Be it known that I, WESLEY KLINKER, of Union Mills, in the county of Mahaska and State of Iowa, have invented certain new and useful Improvements in Hay-Stackers; and I do hereby declare the following to be a full, clear, and exact description of the invention, such as will enable others skilled in the art to which it pertains to make and use it, reference being had to the accompanying drawings, which form part of this specification.

My invention relates to an improvement in hay-stackers; and it consists in the combination of a suitable frame-work provided with guiding-grooves and pulleys for the elevating-ropes to pass over, with the elevator, and the hoisting-ropes which are connected thereto, as will be more fully described hereinafter.

The object of my invention is to provide an apparatus whereby the hay can be raked directly upon the elevator, and then the hay raised by suitable power to the top of the frame and dropped upon the stack without having to be handled any further.

Figure 1 is a side elevation of a hay-stacker embodying my invention. Fig. 2 is a vertical section of the same, showing the rake in a tilted position at the top of the frame.

A represents an inclined frame-work of any suitable construction, and which will be of a height proportioned to the stack which is to be built. The rear side of this frame, where the stack is to be formed, is made vertical, while the front side, up which the elevator moves, is made inclined, as shown. In the inner side of each of the side timbers, B, are made suitable grooves, C, in which the guides of the elevator travel, and which grooves are made curved at their upper ends, as shown. Upon the outer side of these side timbers, at their upper ends, are placed the grooved pulleys D, over which the elevating-ropes E pass. Lower down upon the vertical portion of the frame are placed two other pulleys, F, around which elevating-ropes also pass. To the upper free ends of these ropes the elevating-power is applied. Secured to the frame inside of the side timbers, B, are the inclined guideways G, upon which the elevator rests as it is moved back and forth.

The elevator consists of the cross-bar H, from which project, at right angles to each other, the two sets of prongs or teeth I. One of the elevating-ropes is attached to the outer set of teeth or prongs, so that when the elevating-power is applied the first movement of the elevator is to tilt over toward the frame until the inner set of teeth or prongs rest against the inclined guideways. This elevator is always kept in position by means of the two guiding-pins or projections, which project outward from opposite ends of the cross-bar and catch in the guiding-grooves in the inner sides of the timbers B. When this elevator is at the bottom of the frame, the outer set of teeth or prongs rest upon the ground, so that the hay-rake can force all of the hay which has been raked up directly upon it, and thus prevent any necessity of having to handle it.

Any form of rake that may be preferred may be used; but a windrow-rake having the teeth or prongs projecting in the front of it is preferred, for then the rake can be drawn up, so that the prongs or teeth will run in between the prongs or teeth of the elevator. After the hay has been loaded, either by a rake or any other suitable means, upon the elevator, the elevating-power is applied to the elevating-ropes, when the elevator tilts backward until its rear set of prongs or fingers strike against the guides. In this position the hay is held so that it cannot slip off while the elevator is being raised. When the elevator reaches the curved portion of the slot, it begins to tilt over, and the tilting continues until the hay is emptied over the back of the frame directly upon the stack.

As the hay is raked directly upon the elevator and the elevator is then raised by horse or other suitable power, it will readily be seen that there is no necessity of handling the hay, as the whole work can be done by horse-power.

Having thus described my invention, I claim—

In a hay-stacker, the combination of the frame A, having the side timbers, B, which are grooved upon their inner sides, suitable guiding-pulleys, inclined guideways, an elevator, constructed substantially as shown, and the elevating-ropes, which are secured to the elevator, substantially as set forth.

In testimony whereof I affix my signature in presence of two witnesses.

WESLEY KLINKER.

Witnesses:
W. M. RICE,
JOHN H. FRY.